Nov. 1, 1938.  M. AMBERS  2,135,379
ATTACHMENT FOR A HAY BALER
Filed July 6, 1936
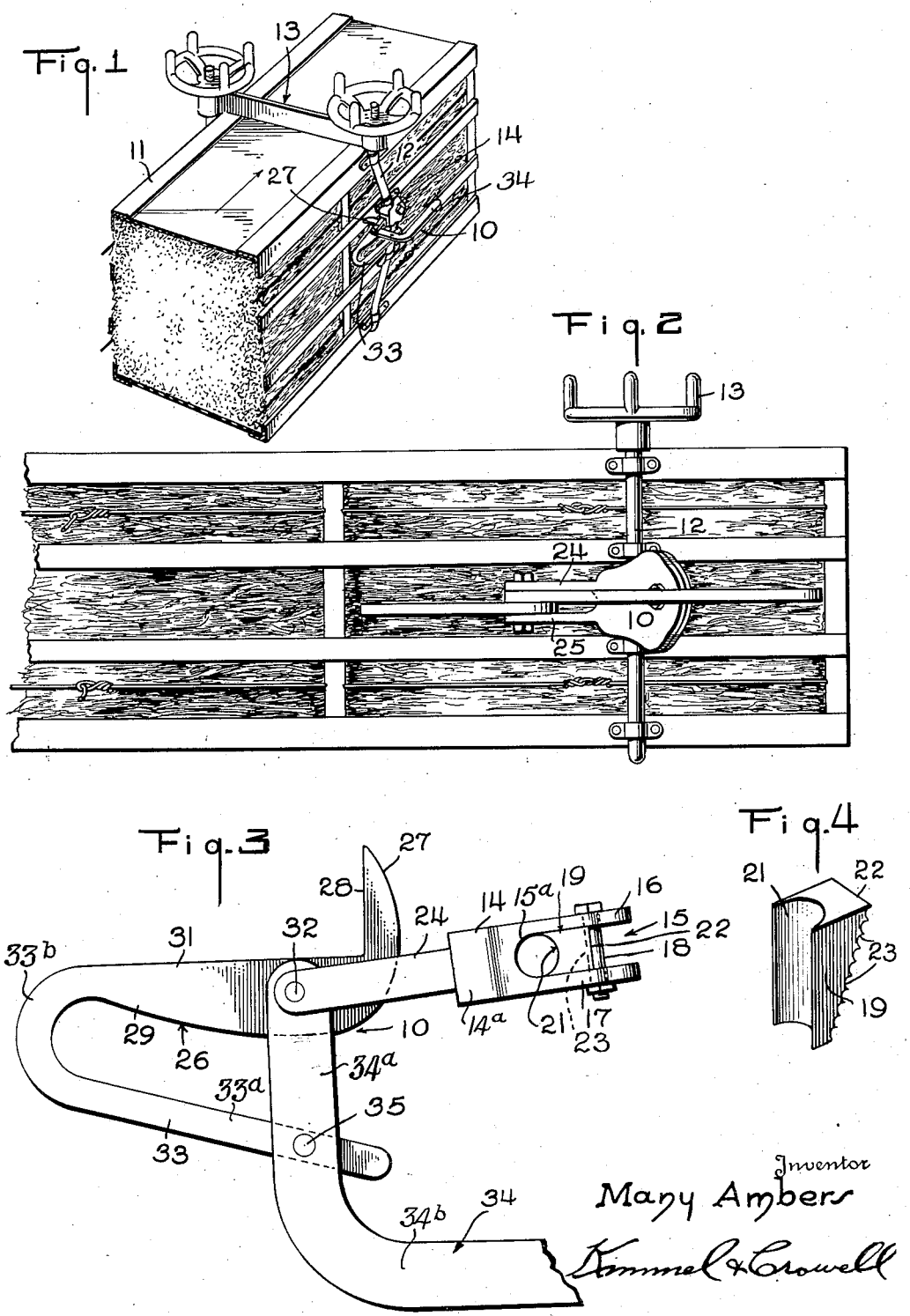
Inventor
Mary Ambers
Kimmel & Crowell
Attorneys Patented Nov. 1, 1938

2,135,379

UNITED STATES PATENT OFFICE 2,135,379

ATTACHMENT FOR A HAY BALER

Many Ambers, Mount Ida, Ark.

Application July 6, 1936, Serial No. 89,184

5 Claims. (Cl. 100—30)

This invention relates to a hay-baler and more particularly to a novel attachment for retarding or stopping the movement of a bale of hay passing through the baler.

It is one object of this invention to provide a manually operated device for use with a hay-baler that will engage a bale of hay passing through the baler in such a manner as to retard or stop the bale for such length of time as would be required to further compress the bale to a pre-determined length.

Another object is to provide a novel hook member that can be detachably mounted to a fixed portion of a hay-baler and employed at the will of the operator to engage a bale of hay passing through the baler and retard its movement for a certain length of time as may be required to compress a bale of hay sufficiently to give to the bale a pre-determined weight.

A further object is to provide a novel attachment for a hay-baler that shall be adapted to engage the hay passing through the baler and stop or retard the movement of the hay until the bale sections therein are compressed sufficiently to permit the bale tie wires which are of pre-determined length to reach around the bale and be properly tied without having to splice such wires.

A still further object is to provide a novel engaging device having the above characteristics that will be simple in structure, rugged, efficient and easy to operate and comparatively cheap to manufacture.

The above and other objects will be made apparent throughout the further description of the invention when taken in connection with the accompanying drawing wherein like reference characters refer to like parts. It is to be distinctly understood that the drawing is not a definition of the invention but illustrates one manner in which the invention may be carried out. The invention will be defined by the appended claims.

In the drawing—

Figure 1 is a fragmental view in perspective showing the end section of a hay-baler equipped with the attachment, Figure 2 is a side elevational view of Figure 1, Figure 3 is an enlarged top plan view of a device embodying the invention, Figure 4 is a perspective view of a novel wedge member employed in the invention.

Referring to the drawing, the present device is here illustrated in connection with the well-known, horse-drawn hay-baler and in order that the invention may be better understood and its utility appreciated, it is here pointed out that the bales of hay formed within the elongated rectangular portion of the baler are separated by wooden blocks. These blocks are inserted into the baler by an operator at such intervals as required to form a bale of a pre-determined length. As these bales separated by the wooden blocks pass progressively through the compressing portion of the baler, an operator feeds bale tie wires around the bale and fastens the co-operating ends of the wire so that when the bale is pushed out of the end of the baler it will remain in compressed baled condition and be held firmly by the wires.

Inasmuch as the intervals at which the blocks are inserted into the baler are dependent upon more or less guess work by the operator, it often happens that a bale is of such a length as to render the bale wires too short. This necessitates the splicing of the wire in order to make it reach around the bale. When this happens it is often necessary to stop the operation of the baler which results in considerable loss of time as well as a waste of wire.

In order to overcome the above difficulties there is here provided a novel bale engaging means represented in its entirety by 10. The means 10 may be readily mounted on either side of the baler 11 by supporting it on the side rod 12 of the head lock 13. The side rod 12 is arranged at one side of the baler and has a portion thereof disposed in spaced relation to said side as shown in Figure 1.

The attachment includes a hinged coupling element 14, a pivoted hook element 26 supported from the coupling element 14 and a pivoted handle element 34 supported from the pivot for the hook element and fixed intermediate its ends to the hook element. The coupling element 14 includes a horizontally disposed head 14ª bifurcated vertically lengthwise thereof to provide a groove 15 and a pair of arms 16, 17. The groove 15 opens at the top, bottom and forward end of the head 14ª and its depth is less than the length of the head. The inner or base wall 15ª of the groove 15 is of concave contour. Arranged within the groove 15 is a vertically disposed wedge 19 having a vertically disposed concave inner face 21 which coacts with the base wall 15ª to provide an opening for the passage of that portion of the rod 12 which is spaced from the side of the baler. The forward face 22 of the wedge 19 inclines inwardly from its upper to its lower end and said face 22 is formed throughout with superposed transversely extending grooves 23. The wedge 19 is confined in the groove 15 by a holdfast means carried by the arms 16, 17 including a bolt 18 for coaction with the grooves 23. The grooves 23 selectively seat on the intermediate portion of the bolt 18 whereby the wedge 19 is held stationary and may be adjusted relative to the base wall 15ᵃ of groove 15. The base wall 15ᵃ of groove 15 and the concave face 21 of the wedge 19 coact to couple the element 14 with the said portion of rod 12. The element 14 however, is revoluble relative to the rod 12, yet through the median of the base wall 15ᵃ and wedge 19 it grips rod 12 sufficiently to support the weight of the entire device 10 on rod 12. The inner end of the head 14ᵃ has extended therefrom a pair of spaced parallel arms 24, 25 having lengthwise edges disposed at right angles to the side edges of the arms 16, 17.

The hook element 26 includes a pointed or tapered end member 27 disposed at right angles to the arms 24, 25 and it is formed with a straight or squared follower surface 28. The hook element 26 includes an elongated arm 29 having a flat surface 31 which terminates at one end in one end of the surface 28 of member 27. The forward end of the arm 29 merges into the outer end of the member 27. The latter is disposed at right angles to the arm 29. The element 26 includes a shank 33 having an outwardly inclined portion 33ᵃ disposed in outwardly spaced relation to the arm 29. The shank 33 includes a curved portion 33ᵇ extending at right angles to an end of the portion 33ᵃ and merging into the rear end of the arm 29. The latter has its forward terminal portion positioned between the arms 24, 25. The arm 29 between its transverse median and its forward end is mounted on a pivot 32 which is fixed to the arms 24, 25 near their rear ends. The arm 29 is arranged in relation to the arms 24, 25 to permit the sharp edge of the end member 27 to be positioned at a point intermediate the ends of the arms 24, 25.

The handle member 34 is of angle form and includes an arm 34ᵃ and an arm 34ᵇ. The arm 34ᵃ extends between the arms 24, 25 and is mounted on the pivot 32. The inclined portion 33ᵃ of the shank 33 is fixedly secured at a point adjacent its forward end to the arm 34ᵃ, as at 35. The arm 34ᵇ constitutes a hand grip.

With respect to the operation of the device, when it is necessary or desired to stop the hay moving through the baler so that the bales may be compressed sufficiently to permit the baling wires to be properly tied without splicing, the operator grasps the gripping portion 34ᵇ of element 34 and moves the latter in a direction to push the piercing member 27 into the hay passing thereby and as the hay tends to move against the surface 28 of the member 27 the pressure thereof will tend to shift the surface 31 of the arm 29 against the side of the bale and such action will move the element 14 about the rod 12 in a direction towards the baler. When the surface 31 of arm 29 is firmly pressed against the side of the bale of hay, it will cooperate with the surface 28 of the member 27 to retard or stop the travel of the baler. After the bale has been sufficiently compressed to permit the wires to pass over the bale to be tied, the operator grasps the element 34 and removes the attachment from contact with the bale of hay and permits the latter to pass on through the baler.

The present device may also be employed for producing bales of hay of increased weight. The device is very easy and simple to operate and requires no additional operators since it can be actuated by the operator employed for tying the bale wires.

While merely one form of the invention has been illustrated and described, it will be obvious to those skilled in the art that certain changes, substitutions, modifications, additions and omissions may be made in the present structure without departing from the spirit and scope of the appended claims.

What I claim is:

1. In an attachment for a hay-baler, a horizontally disposed revoluble head formed with a vertical groove opening at the top, bottom and forward end thereof, a pair of superposed spaced arms extended from the rear end of the head, adjustable means mounted in and coacting with the base wall of the groove to provide an opening for the passage of a support for the attachment, a bolt mounted on the head, extending across said groove and engageable with said means at spaced points of the latter for removably retaining said means in its adjusted position whereby the wall of the opening will grasp the support to secure the attachment to the latter, said head capable of being revolved relatively to the support, a horizontally disposed hook element including an arm, a piercing member and a shank spaced from such arm, the latter having its forward terminal portion arranged between the arms on said head, said member extended at an angle to the forward end of the arm of the hook element and inwardly at an angle to the arms on the head, a pivot at the rear ends of the arms on said head and extending through the hook element arm at a point between the transverse median and forward end of such arm, and an angle shaped handle element formed of a pair of arms, one being anchored to said shank and mounted on said pivot and the other constituting a hand grip.

2. In an attachment for a hay-baler, a bifurcated head formed with a pair of rearwardly extending arms, means carried by said head and extending into the furcation of the latter for connecting the head to a support, said means coacting with the head for securing the attachment on the support, said head being revoluble relative to the support, a hook element including an arm having its forward terminal portion arranged between the arms of said pair, a piercing member extending at an angle to the forward end of said arm and a shank merging into the rear end of the latter, said piercing member disposed at an angle to and extending inwardly from said pair of arms, a pivot carried by and disposed in proximity to the rear ends of said pair of arms, said hook element arm being mounted on said pivot at a point between its transverse median and forward end thereof, and a handle element extending between the arms of said pair, mounted at one end on said pivot and fixedly secured intermediate its ends to said shank.

3. In an attachment for a hay-baler, a bifurcated head formed with a pair of rearwardly extending arms, means carried by said head and extending into the furcation of the latter for connecting the head to a support, said means coacting with the head for securing the attachment on the support, said head being revoluble relative to the support, a hook element including an arm having its forward terminal portion arranged between the arms of said pair, a piercing member extending at an angle to the forward end of said arm and a shank merging into the rear end of the latter, said piercing member disposed at an angle to and extending inwardly from said pair of arms, a pivot carried by and disposed in proximity to the rear ends of said pair of arms, said hook element arm being mounted on said pivot at a point between its transverse median and forward end, and a handle element extending between the arms of said pair, mounted at one end on said pivot and fixedly secured intermediate its ends to said shank, said hook element arm being of greater length than said piercing member and having a horizontally disposed squared inner lengthwise surface, said member having its rear surface squared, the forward end of said surface of such arm meeting the inner end of the said surface of said member.

4. In an attachment for a hay-baler, a bifurcated head formed with a pair of rearwardly extending arms, means carried by said head and extending into the furcation of the latter for connecting the head to a support, said means coacting with the head for securing the attachment on the support, said head being revoluble relative to the support, a hook element including an arm having its forward terminal portion arranged between the arms of said pair, a piercing member extending at an angle to the forward end of said arm and a shank merging into the rear end of the latter, said piercing member disposed at an angle to and extending inwardly from said pair of arms, a pivot carried by and disposed in proximity to the rear ends of said pair of arms, said hook element arm being mounted on said pivot at a point between its transverse median and forward end thereof, and a handle element extending between the arms of said pair, mounted at one end on said pivot and fixedly secured intermediate its ends to said shank, said hook element arm being disposed horizontally and having a squared inner side surface, and said member having its rear surface squared, the squared surface on said member at its inner end meeting the forward end of the squared surface of said hook element arm.

5. The structure set forth in claim 2 having the said means carried by the head including a tapered wedge partly filling the groove and a bolt mounted in the head and disposed transversely of the groove forwardly of the wedge, said wedge having a concave rear end face and an inclined forward end face formed with transversely extending superposed grooves for selectively receiving an intermediate portion of said bolt.

MANY AMBERS.